United States Patent Office
2,915,073
Patented Dec. 1, 1959

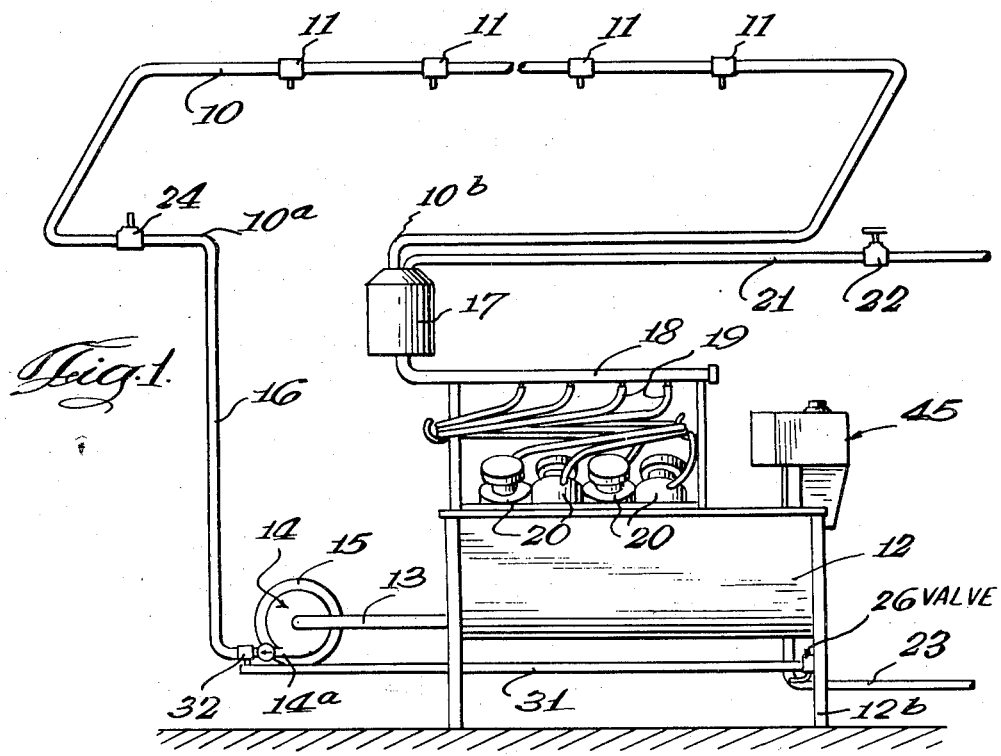
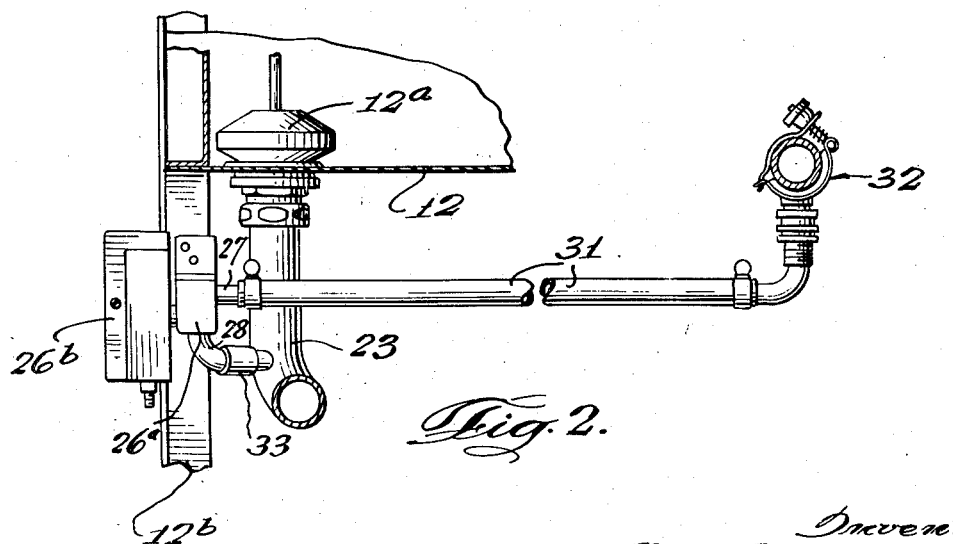

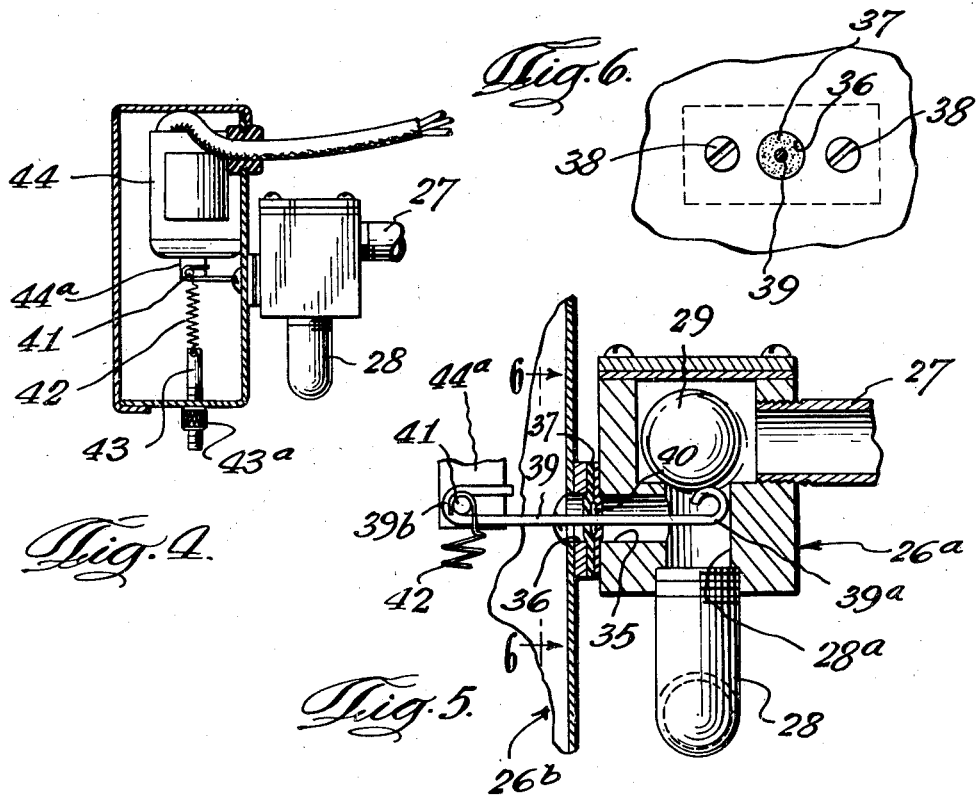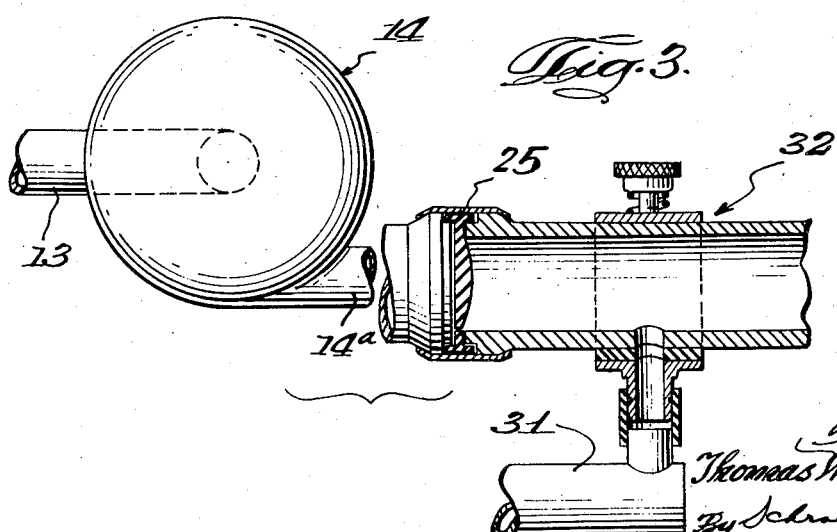

2,915,073

MILK PIPE LINE WASHING SYSTEM

Thomas W. Merritt, St. Charles, Ill., assignor to Babson Bros. Co., a corporation of Illinois Application November 29, 1954, Serial No. 471,739

4 Claims. (Cl. 134—58)

This invention is concerned with an improved milk pipe line washing system and with a drain valve for use therewith.

Over the past few years more and more dairy farmers have been installing carry-away milk pipe line systems in which the milk is delivered directly from the animal being milked into a pipe line through which it flows, generally under the influence of vacuum, to a cooler, holding tank or the like. Carry-away systems as a class are to be distinguished from milking systems in which the milk flows into a container at the point of milking.

It is necessary to wash thoroughly all milk contacted portions of the milking system immediately after the completion of a milking operation and this presents several problems in connection with milk pipe lines. With early carry-away pipe line systems it was the usual practice to disassemble the sections of the pipe line, together with the various apparatus used therewith, and to wash the various parts by hand. This of course is a time-consuming and laborious operation. Several systems have been devised for permitting "in place" washing of milk pipe lines, in which the lines are washed by circulating a washing solution through them. Such systems take various forms depending to a certain extent on the nature of the milk pipe line system, and may be operated either by vacuum, by a force pump or by a combination thereof.

The usual practice in cleaning a milk pipe line, subject of course to local sanitary regulations, is first to circulate rinse water through the line, then a hot washing solution and finally a sanitizing solution (in some areas, the sanitizing solution is circulated immediately before the next milking). It is, of course, necessary to drain each solution from the system before circulating the next.

I have devised and disclosed in detail in copending application, Serial No. 485,773, filed February 2, 1955, and assigned to the assignee of this application, an electrically controlled, automatic milk pipe line washing system and a control apparatus therefor. This system contemplates the provision of a reservoir for a washing solution together with means for automatically filling the reservoir with water at the proper temperature for the various stages of the washing operation and the addition thereto at the proper times of the required detergent and sanitizing materials. The filling of the reservoir, circulation of the washing solution through the milk pipe line and draining of the reservoir and pipe line following each stage of the washing operation are all controlled by an automatic electrical timing apparatus. The farmer need not manually initiate each phase of the washing operation, but may attend to other duties while the milk pipe line is being washed.

Many milking systems employ a milk pump, generally of the centrifugal type, for separating the milk from the evacuated portion of the milking system and moving the milk on to a holding tank or through further apparatus, as a cooler or pasteurizer. It is often desirable to use the milk pump to force the washing solution through at least a portion of the pipe line system during the washing operation. The milk pump is normally mounted a few inches above the floor of the milking parlor and an upright section of pipe is connected to the pump outlet through which the milk is delivered to the next handling apparatus. In addition, a check valve is provided in the outlet of the milk pump to prevent loss of vacuum during the milking operation when the inlet of the pump is connected to the evacuated system and the outlet to a non-evacuated system.

In practice the washing reservoir is normally mounted on legs or along the wall of the milking parlor so that the bottom thereof is spaced a substantial distance, as 14 to 16 inches, above the floor. The drain attached to the reservoir is provided with valve means or a stopper which is normally maintained in a closed position except when the system is actually being drained. The inlet of the milk pump is connected to the reservoir before the start of the washing operation, at least a portion of the pump housing (and the outlet and check valve) being below the level of the bottom of the reservoir and forming the low point of the system.

Between stages of the washing operation, the pipe line and reservoir are drained of the previous washing solution. Most of the washing solution in the pipe line drains directly into the reservoir and from there into a waste system. A certain amount of washing solution is however trapped in the upright section of the pipe connected to the outlet of the pump, or any pipe draining into this portion, due to the action of the check valve in the outlet. In addition, following the completion of the washing operation there is a certain amount of condensation and residual drainage which collects in the system. This liquid tends to collect at the low point of the system, the outlet connection of the pump. It is of course undesirable to permit any portion of the washing solution to remain in the system or to allow condensation to collect therein as it would contaminate the milk during the next milking operation.

I have devised and disclose and claim herein an arrangement for facilitating the draining of a washing solution from the pipe line.

A principal feature of my invention is the provision of a pressure washing system with an automatic drain, the drain being maintained in closed position during washing operations and in open position at all other times. Another feature is that the drain is located at the low point of the system so that condensation or washing solution draining from crevices or pockets in the line is removed from the system.

A further feature is that the drain may be closed, as by automatic energization of a solenoid, to permit filling of the reservoir with a washing solution. Still another feature is that the drain valve may be held closed by the pressure of the washing solution during operation of the pump.

Another feature is the provision of a washing system comprising a milk pipe line including an upright portion, a pump for circulating washing solution through the pipe line, an upright portion of the pipe line being connected to the outlet of the pump, a check valve in the system preventing back flow of any fluid through the pump, and valve means connected to the pipe line adjacent the check valve for draining washing solution from the line, the valve being maintained closed during operation of the pump.

A further feature is the provision, in a milk pipe line washing system including a pump for circulating the washing solution through the pipe line under pressure, of a drain valve comprising a housing having an inlet connected to the pipe line and having an outlet, a valve member in the housing and adapted to seat in the outlet during operation of the pump and means for removing the valve member from the outlet on relief of the pressure on the fluid when the pump is stopped. And another feature is that the system includes a reservoir for washing solution and having a drain and that the outlet of the valve housing is connected to the reservoir drain.

Still a further feature is the provision of a fluid valve comprising a housing having an outlet opening, a valve member in the housing and adapted to seat in the outlet under the influence of the pressure of fluid in the housing, resilient biasing means urging the valve member away from the seat in the outlet, the pressure of the fluid on the valve member normally keeping the member seated against the force of the resilient means. And another feature is that the means are provided for rendering the biasing means inoperative permitting the valve member to seat in the outlet opening.

Further features and advantages of the invention will readily be apparent from the following specification and from the drawings, in which:

Figure 1 is a diagrammatic view of a milk pipe line washing system embodying the invention;

Figure 2 is a fragmentary view partially in section of the valve and drain;

Figure 3 is a fragmentary view, partially in section, of the milk pump and outlet connection;

Figure 4 is a fragmentary view partially in section of the valve control means;

Figure 5 is an enlarged fragmentary sectional view of the valve; and

Figure 6 is a view taken along line 6—6 of Figure 5.

While as pointed out previously there are many types of washing systems for carry-way milk pipe lines, the present invention is concerned primarily with an improvement in a system wherein the washing solution is cirulated through the pipe line, or a portion thereof, under pressure, as by utilizing a milk pump. In Figure 1 of the drawings such a milk pipe line washing system is shown.

Milk pipe line 10 extends around the milking parlor or barn and is provided with a plurality of individual stall cocks 11 to which the hose, as 19, from the milking apparatus may be connected. The stall cocks may be of the form shown in copending Thomas application, Serial No. 319,812, filed November 12, 1952, Patent No. 2,783,771, dated March 5, 1957, and are movable between an open position in which they communicate with the pipe line and a closed position in which the pipe line is sealed, it being understood that they are normally moved to closed position during washing.

A reservoir 12 is provided for the washing solution and has an outlet 13 which is connected to the inlet of a rotary pump 14 driven by electric motor 15. Under most circumstances, the pipe line 10 will extend around the milking parlor, at an elevation of several feet above the floor while the pump 14 is positioned on or a few inches above the floor. Reservoir 12 is normally mounted on legs so that the outlet 13 is above the lower portion of the housing of pump 14. The outlet 14a of the pump is so positioned that it forms the low point of the system and is connected through an upright pipe 16 to one end 10a of the pipe line. The opposite end 10b of the pipe line is connected to a milk receiving chamber 17. An outlet in the bottom of chamber 17 is connected to a manifold 18 positioned above reservoir 12 and to which are attached milk hoses 19 of milk withdrawal units 20 supported on a rack in reservoir 12. A vacuum line 21 is also connected to receiver 17 but is closed by valve 22 during the washing operation.

The connection of the milk pipe line and other apparatus shown in Figure 1 is of course not that which would be used during the milking operation. When milking, the end 10a of the pipe line will also be connected to the top of milk receiving chamber 17 and valve 22 opened to apply vacuum to the system for drawing milk through the pipe line into the chamber. The outlet of chamber 17 will be connected to the inlet of pump 14 which transfers the milk from the evacuated milk pipe line to a non-evacuated holding tank or other processing apparatus. Further details of the connection and operation of the system during milking may be found in copending Babson application, Serial No. 229,185, filed May 31, 1951, assigned to the assignee of this application (now abandoned) and my copending application, Serial No. 456,-359, filed September 16, 1954, Patent No. 2,800,134, dated July 23, 1957.

During the washing operation the reservoir 12 is first filled with a rinse water and motor 15 energized, driving pump 14 and circulating the rinse water under pressure through pipe line 10, receiving chamber 17, manifold 18 and milk withdrawal apparatus 20 back into the reservoir. After the rinse water has been circulated for the proper period of time, as five minutes, pump 14 is stopped and the rinse water permitted to drain from the pipe line into the reservoir. At the same time stopper 12a is raised and the water is drained from reservoir 12 through waste pipe 23. An automatic vent valve 24 is connected to pipe line 10 at a suitable point to facilitate the draining of the line. The details of the construction and operation of vent valve 24 may be found in my aforementioned copending application, Serial No. 456,359.

The outlet 14a of the pump is provided with a check valve 25 (Figure 3) which prevents the loss of vacuum therethrough during the milking operation. This is necessary as the pump is generally operated only intermittently during the milking operation and the inlet is connected to the evacuated portion of the milk handling system. During the washing operation, however, check valve 25 prevents the back flow of the washing solution through the pump and prevents complete draining of the pipe line, at least the upright member 16 and that part of the pump body below inlet pipe 13 remaining filled with the washing solution.

In order to facilitate complete draining of the pipe line, I have provided an automatic drain valve which remains closed while the washing solution is circulated through the pipe line but which opens as soon as the pump is stopped. The valve itself, indicated generally as 26, is mounted on a leg 12b of the reservoir and is composed of two portions, a valve housing 26a and a control unit 26b. The valve housing 26a is provided with an inlet 27, an outlet 28, and a valve member 29 adapted to seat in outlet or drain opening 28a. The inlet 27 is connected through a hose 31 to the pipe line 10, the connection to the pipe line preferably being made at the low point of the milk handling portion of the system; in the embodiment of the invention shown in the drawings this is between the bottom of upright section 16 and check valve 25, as indicated at 32, Figure 1. The outlet 28 of the valve is connected through a coupling 33 to reservoir drain pipe 23.

So long as pressure is maintained on the washing solution circulating through the pipe line by pump 14, valve member 29 is kept seated in the outlet opening 28a by the pressure of the fluid in valve housing 26a. When the pump has stopped, however, and the pressure on the washing solution removed, it is desired to open the valve to facilitate draining of the pipe line. For this reason resilient biasing means are provided which urge valve member 29 away from the seat in outlet opening 28a but which is overcome by the pressure of the washing solution during the period of time the pump is operating.

As best seen in Figure 5, an opening 35 extends through the wall of valve housing 26a and joins outlet opening 28a. The opening 35 is aligned with a similar opening 36 through the wall of control unit 26b. A pair of resilient gasket members 37 are placed between the adjacent surfaces of valve housing 26a and control unit 26b, the valve housing and control unit being secured together by a pair of screws 38. A valve operating arm 39 has a washer 40 secured at an intermediate point thereon, the washer being clamped between resilient gaskets 37 providing a pivotal mounting for the operating arm. End 39a of the arm extends through opening 35 into outlet opening 28a of the valve housing, while the opposite end 39b of the arm extends into control unit 26b. The end 39b of the valve operating arm is bent around a pin 41 to which is attached one end of a bias spring 42. The opposite end of spring 42 is secured to a threaded rod 43 which extends through the wall of control unit 26b and has a knurled adjusting nut 43a threaded thereon.

Spring 42 tends to pivot operating arm 39 about its mounting on resilient gaskets 37, end 39a thereof urging valve member 29 upwardly from outlet opening 28a. Tension spring 42 is so adjusted that valve member 29 remains seated while pump 14 is in operation. As soon as pump 14 is stopped and the pressure on the fluid in the system relieved, valve member 29 is lifted and the washing solution in at least a portion of the pipe line permitted to drain through the valve housing 26a into waste pipe 23.

The armature 44a of solenoid 44 is also connected to pin 41. When solenoid 44 is energized, the armature 44a is drawn upwardly against the pull of spring 42 permitting valve member 29 to seat properly in outlet opening 28a. Solenoid 44 may be energized at the start of each portion of the washing operation allowing the valve to close and permitting filling of reservoir 12. Of course, as soon as pressure is built up in the washing solution as the result of operation of pump 14, this in itself will keep the valve closed and the solenoid may be deenergized.

After the completion of the washing and sanitizing operation there is a certain amount of drainage from the pipe line for a period as long as several hours. This drainage is due in part to the retention of some of the washing solution in pockets and crevices of the pipe line and in part to condensation. During the period after the pipe line has been washed and before the next milking operation stopper 12a is normally seated in the drain 23 of reservoir 12 and as a result all drainage will tend to collect at the low point of the system. It has been pointed out previously that the inlet hose 31 of drain valve 26 is connected to this point of the system. Inasmuch as valve 26 is open during this period, through the action of bias spring 42, the drainage liquid will all flow out of the system, through valve 26 and into drain pipe 23.

The washing system and drain valve just described are particularly adapted for use with a washing control unit 45 which automatically changes the washing solutions and times the washing operation as previously described. Details of the construction and operation of this control unit may be found in my copending aplication, Serial No. 485,773, filed February 2, 1955.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. In a milk pipeline washing system of the character described: a pump for circulating washing solution through a milk pipeline connected to the outlet of said pump and having a portion at a higher elevation than that of the pump; a check valve in said system adjacent the pump outlet for preventing back flow through said pump; and valve means connected to said pipeline at the lowest point thereof and adjacent the check valve, said valve means having a drain opening for draining washing solution trapped therein by the check valve, said valve means being maintained closed during circulation of said washing solution by pump pressure acting through the circulating washing solution.

2. In a milk pipeline washing system of the character described: a pump for circulating washing solution through a milk pipeline connected to the outlet of said pump and having a portion at a higher elevation than that of the pump; a check valve in said system adjacent the pump outlet for preventing back flow through said pump; valve means connected to said pipeline at the lowest point thereof and adjacent the check valve said valve means having a valve member and a drain opening for draining washing solution trapped therein by the check valve, said valve means being maintained closed during circulation of said washing solution by pump pressure acting through the circulating washing solution; and means for removing said valve member from said outlet on relief of the pressure on said fluid, permitting said solution to drain from said pipeline.

3. In a milk pipeline washing system of the character described: a pump for circulating washing solution through a milk pipeline connected to the outlet of said pump and having a portion at a higher elevation than that of the pump; a check valve in said system adjacent the pump outlet for preventing back flow through said pump; valve means, connected to said pipeline at the lowest point thereof and adjacent the check valve said valve means having a valve member and a drain opening for draining washing solution trapped therein by the check valve, said valve means being maintained closed during circulation of said washing solution by pump pressure acting through the circulating washing solution; resilient biasing means urging said valve member toward open position; and means for rendering said biasing means inoperative, permitting said valve to seat in said outlet opening.

4. The fluid valve of claim 3 wherein the means for rendering said biasing means inoperative is a solenoid.

References Cited in the file of this patent

UNITED STATES PATENTS

| | | |
|---|---|---|
| 1,552,998 | Menge | Sept. 8, 1925 |
| 2,180,393 | Bouget | Nov. 21, 1939 |
| 2,222,516 | Powell | Nov. 19, 1940 |
| 2,558,628 | Redin | June 26, 1951 |
| 2,600,618 | Cobb | June 17, 1952 |
| 2,636,516 | Armstrong | Feb. 28, 1953 |
| 2,701,580 | Sullivan | Feb. 8, 1955 |
| 2,708,448 | Reeve | May 17, 1955 |
| 2,751,917 | Low | June 26, 1956 |
| 2,754,835 | Casady | July 17, 1956 |

FOREIGN PATENTS

| | | |
|---|---|---|
| 140,689 | Great Britain | Apr. 1, 1920 |
| 913,652 | France | June 3, 1946 |
| 1,019,866 | France | Nov. 5, 1952 |